(12) United States Patent
Gutermuth et al.

(10) Patent No.: US 9,372,480 B2
(45) Date of Patent: Jun. 21, 2016

(54) METHOD FOR CONFIGURING A COMMUNICATION INTERFACE MODULE IN A CONTROL OR AUTOMATION SYSTEM

(71) Applicant: ABB AG, Mannheim (DE)

(72) Inventors: Stefan Gutermuth, Lorsch (DE); Gernot Gaub, Hockenheim (DE); Brigette Blei, Berlin (DE)

(73) Assignee: ABB AG, Mannheim (DE)

( * ) Notice: Subject to any disclaimer, the term of this patent is extended or adjusted under 35 U.S.C. 154(b) by 272 days.

(21) Appl. No.: 14/147,156

(22) Filed: Jan. 3, 2014

(65) Prior Publication Data

US 2014/0122754 A1    May 1, 2014

Related U.S. Application Data

(63) Continuation of application No. PCT/EP2012/002822, filed on Jul. 5, 2012.

(30) Foreign Application Priority Data

Jul. 6, 2011    (DE) .......................... 10 2011 107 318

(51) Int. Cl.
  *G06F 13/00*    (2006.01)
  *G05B 19/05*    (2006.01)
  *G05B 19/042*    (2006.01)

(52) U.S. Cl.
  CPC .......... *G05B 19/054* (2013.01); *G05B 19/0423* (2013.01); *G06F 13/00* (2013.01); *G05B 2219/25145* (2013.01)

(58) Field of Classification Search
  CPC .......... G05B 2219/31138; G05B 2219/25009; G05B 2219/25021; H04L 2012/40221; H04L 2012/40215
  USPC ................................................. 710/306, 315
  See application file for complete search history.

(56) References Cited

U.S. PATENT DOCUMENTS 5,485,590 A    1/1996    Hyatt et al.
5,978,593 A    11/1999    Sexton
(Continued)

FOREIGN PATENT DOCUMENTS

DE    41 00 198 A1    7/1991
DE    100 49 049 A1    12/2001
(Continued)

OTHER PUBLICATIONS

International Search Report (PCT/ISA/210) mailed on Oct. 23, 2012, by the European Patent Office as the International Searching Authority for International Application No. PCT/EP2012/002822.
(Continued)

*Primary Examiner* — Brian Misiura
(74) *Attorney, Agent, or Firm* — Buchanan Ingersoll & Rooney PC

(57) ABSTRACT

A method and system for configuring at least one communication interface module in a control or automation system includes a communication interface module for coupling at least two field bus systems. At least one first functional unit integrated in the communication interface module implements a connection to a configured superordinate controller via a first communication link on the basis of a first field bus protocol. At least one second functional unit integrated in the communication interface module implements a connection for field devices via a second communication link on the basis of a second field bus protocol. At least one further, third functional unit integrated in the communication interface module is configured to connect further field devices via input and/or output functionalities integrated in the communication interface module, and at least one serial interface integrated in the communication interface module can be used to configure the communication interface module.

12 Claims, 2 Drawing Sheets

(56) References Cited

U.S. PATENT DOCUMENTS

| | | | |
|---|---|---|---|
| 6,449,715 B1 * | 9/2002 | Krivoshein | G05B 19/4185 700/1 |
| 7,246,194 B2 * | 7/2007 | Train | G05B 19/4186 710/305 |
| 7,370,084 B2 | 5/2008 | Dinges et al. | |
| 7,835,295 B2 * | 11/2010 | Brewer | H04L 12/10 370/252 |
| 7,836,217 B2 * | 11/2010 | Tegnell | H04L 12/40032 710/15 |
| 7,889,747 B2 * | 2/2011 | Hodson | H04L 67/12 370/401 |
| 7,898,978 B2 | 3/2011 | Dinges et al. | |
| 8,412,505 B2 * | 4/2013 | Moriyama | G06F 17/5009 703/13 |
| 9,021,167 B2 * | 4/2015 | Kaufleitner | H04L 63/16 710/105 |
| 2004/0027875 A1 | 2/2004 | Dinges et al. | |
| 2004/0243695 A1 | 12/2004 | Dinges et al. | |
| 2005/0228509 A1 | 10/2005 | James | |
| 2008/0189441 A1 | 8/2008 | Jundt et al. | |
| 2008/0215797 A1 | 9/2008 | Dinges et al. | |
| 2012/0233370 A1 | 9/2012 | Kolblin et al. | |
| 2014/0108685 A1 * | 4/2014 | Ismail | G05B 19/0423 710/105 |
| 2014/0121785 A1 * | 5/2014 | Ismail | H04L 12/40032 700/3 |
| 2014/0121788 A1 * | 5/2014 | Gutermuth | G05B 19/054 700/19 |
| 2014/0380001 A1 * | 12/2014 | Schubert | G06F 9/5077 711/153 |

FOREIGN PATENT DOCUMENTS

| | | | |
|---|---|---|---|
| DE | 101 59 930 A1 | 4/2003 | |
| DE | 103 33 885 A1 | 2/2005 | |
| DE | 10 2008 007 230 A1 | 8/2008 | |
| DE | 10 2009 045 901 A1 | 4/2011 | |
| EP | 2 112 570 A1 | 10/2009 | |
| SE | WO 2007102779 A1 * | 9/2007 | H04L 12/40006 |

OTHER PUBLICATIONS

German Search Report issued on Jan. 18, 2012.

* cited by examiner

METHOD FOR CONFIGURING A COMMUNICATION INTERFACE MODULE IN A CONTROL OR AUTOMATION SYSTEM

RELATED APPLICATIONS

This application claims priority as a continuation application under 35 U.S.C. §120 to PCT/EP2012/002822, which was filed as an International Application on Jul. 5, 2012 designating the U.S., and which claims priority to German Application No. 10 2011 107 318.7 filed in Europe on Jul. 6, 2011. The entire contents of these applications are hereby incorporated by reference in their entireties.

FIELD

The present disclosure relates to a method for configuring a communication interface module in a control or automation system, such as a control or automation system of peripheral design, for example. In addition, the present disclosure relates to a system for implementing the method. The present disclosure can be used, for example, in process automation or machine control for controlling processes and/or installation components.

BACKGROUND INFORMATION

Automation systems for controlling a technical process or a technical installation can include a central control unit. The central control unit uses a communication interface module, also referred to as a gateway device or bus coupler, to communicate with the input/output units and/or field devices of the automation system. In this case, the gateway device provides the communication capability between field buses from different protocols, for example, between the FOUNDATION field bus and PROFIBUS.

The connection between the field devices and the central control unit is realized via the input/output devices.

The gateway devices used in automation or control systems can be connected to the superordinate controller via a first bus and communicate with the field devices or input/output devices via a second bus.

Before the control system is capable of being used, the hardware provided therefor is mapped in a programming tool, also referred to as an engineering tool, as part of a programmable logic controller (PLC) or control project. The control project is used to store information about input/output addresses for this hardware and to make the information accessible to the user program.

So that the inputs and outputs of the hardware of the system can be addressed, it is first of all necessary to configure the control device, the gateway devices and the input/output devices connected thereto in accordance with the respective customer-specific requirements. This may be supported by the programming tool. The created configuration, subsequently also referred to as a control configuration, is used to map the linking of the hardware (e.g., input/output devices, communication couplers) of the automation system. The method described above for configuring the control device is described in IEC 61131-3, for example.

The mapping, provided by means of the created configuration, of the hardware of the automation system includes the following information, inter alia:
 (i) general parameters of the CPU of the control device of the system,
 (ii) number of input/output devices that need to be connected to the control device via a field bus,
 (iii) inputs and outputs of all devices connected to the bus,
 (iv) parameterization of the input/output devices,
 (v) configuration of the inputs and outputs of the devices,
 (vi) parameterization of the input/output channels of the input/output devices,
 (vii) setting of the mode of operation and the parameters of the serial interfaces of the system, and/or
 (viii) type, general parameters and protocols of the communication couplers used or of the communication network used.

For the communication of field bus systems processing different protocols, the gateway device uses an Ethernet-based or PROFINET protocol, for example, to communicate with the central control unit and uses a field bus protocol, such as CAN or CANopen, to communicate with input/output devices, and/or field devices, connected thereto.

The gateway device connected to the PROFINET bus, the input and output devices and the connections or links thereof to one another are each configured separately by an operator unit. There is, however, no provision for complete configuration of the PROFINET gateway devices using the previously described configuration of the control or automation system. For instance, the relevant gateway device is first of all configured as a separate device and then incorporated into the previously created configuration by additional links, which influences the complexity for implementing and configuring the provided hardware in the control or automation system. Since the configuration of the hardware map is split or divided into different portions or branches, the map of the hardware is arranged in different portions in the configuration tree, and additional connections between the devices of the control or automation system need to be created. A confusing configuration structure is thereby obtained, particularly when configuring relatively large control or automation systems. It is also often necessary to use a plurality of configuration tools, since, as described above, the gateway device connected to the PROFINET bus is configured separately by an operator unit, for example.

To this end, the gateway device contains serial interfaces, for example, in the form of RS232, RS422 and/or RS485 interfaces, that can be used to implement programming of the module and/or communication with devices connected to the gateway device.

SUMMARY

An exemplary embodiment of the present disclosure provides a method for configuring at least one communication interface module in a control or automation system, where the communication interface module connects at least two field bus systems to one another. The exemplary method includes implementing a connection, by at least one first functional unit integrated in the communication interface module, to a superordinate controller via a first communication link on the basis of a first field bus protocol. The exemplary method also includes implementing a connection, by at least one second functional unit integrated in the communication interface module, for field devices via a second communication link on the basis of a second field bus protocol. In addition, the exemplary method includes connecting, by least one third functional unit integrated in the communication interface module, further field devices via input and/or output functionalities integrated in the communication interface module. Furthermore, the exemplary method includes incorporating the communication interface module into a previously created hierarchical tree for the configuration of the control or automation system such that the configuration of the at least one first functional unit as a first branch in the configured communication interface module represents and configures a connection to the superordinate controller, via the first communication link on the basis of the first field bus protocol. The exemplary method also includes representing and configuring, by the configuration of the second functional unit as a second branch in the incorporated communication interface module, a second connection to the field devices via the second communication link on the basis of the second field bus protocol. In addition, the exemplary method includes representing and configuring, by the configuration of the third functional unit as further branches from the incorporated communication interface module, at least one of input functionalities and or output functionalities for the further field devices.

An exemplary embodiment of the present disclosure provides a system for configuring at least one communication interface module in a control or automation system, where the communication interface module connecting at least two field bus systems to one another. The communication interface module includes at least one first functional unit configured to connect to a superordinate controller via a first communication link on the basis of a first field bus protocol, at least one second functional unit configured to connect field devices to one another via a second communication link on the basis of a second field bus protocol, and at least one third functional unit integrated in the communication interface module configured to connect further field devices via input and/or output functionalities integrated in the communication interface module. The communication interface module is incorporated into a previously created hierarchical tree for the configuration of the control or automation system such that (i) the configuration of the first functional unit as a first branch in the configured communication interface module is arranged to represent and configure a connection to the superordinate controller via the first communication link, (ii) the configuration of the second functional unit as a second branch in the represented and configured communication interface module is arranged to represent and configure a second connection to the field devices via the second communication link, (iii) the configuration of the third functional unit as further branches from the configured communication interface module is arranged to represent and configure input and/or output functionalities for the further field devices, and at least one additional branch is existent for representing and configuring at least one serial interface integrated in the communication interface module.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
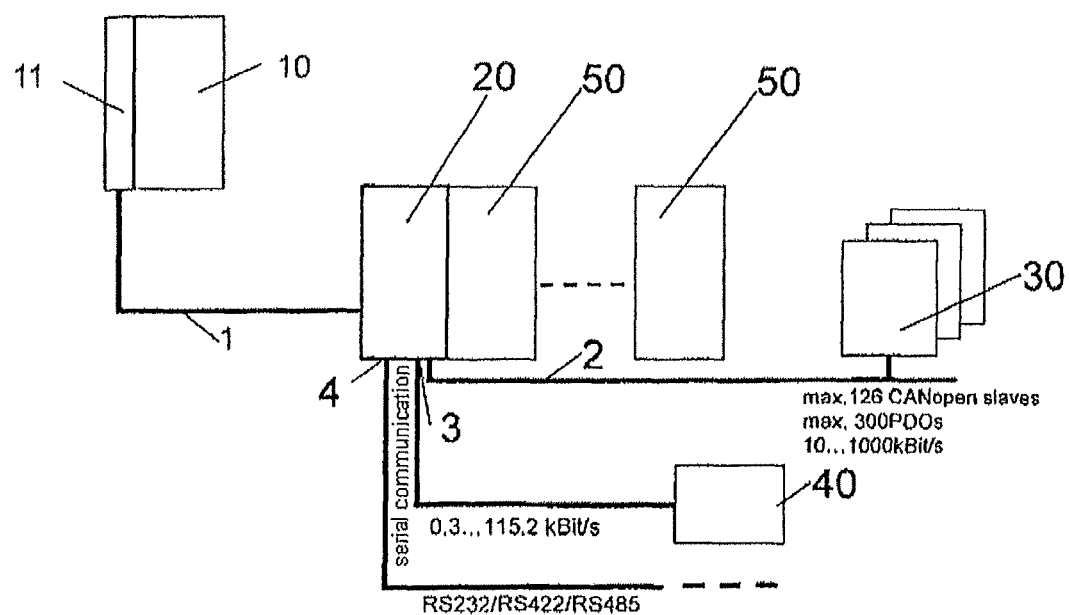
FIG. 1 shows a design of a gateway device for connecting a multiplicity of field devices to a superordinate control unit, according to an exemplary embodiment of the present disclosure.

Exemplary embodiments of the present disclosure simply the configuration of the automation and control system by incorporating a communication interface module for connecting field buses from different protocols, and reduce the configuration complexity for the connection of field devices by allowing complete configuration of the PROFINET gateway devices using the control configuration of the control or automation system.

Features of the present disclosure will be described hereinafter with respect to the functions the devices of the method and system are configured to perform. It is to be understood that each of the devices of the present disclosure can include a processor (e.g., a general processor or an application specific processor) that is configured to execute a computer program tangibly recorded in a non-transitory computer-readable recording medium (e.g., a non-volatile memory such as a ROM, hard disk drive, flash memory, optical memory, etc.) resident in the device that, when executed by the processor, causes the processor of the respective device to carry out the operative functions of the device as described herein. The elements of the method and system as described herein are to be understood as each constituting a hardware device of the system. The devices may be described as units, controllers, master, slave and/or modules. The devices can be stand-alone devices or can be combined and/or integrated with other devices to carry out the operative features as described herein.

Exemplary embodiments of the present disclosure provide a method and system for configuring at least one communication interface module in a control or automation system, which may be of a peripheral design, for example. Advantageous refinements and improvements of the method and system according to the present disclosure in process automation or machine control for controlling processes and/or installation components are described herein with reference to exemplary embodiments of the present disclosure.

The method for configuring at least one communication interface module in a control or automation system that may be of a peripheral design is based on a communication interface module for coupling at least two field bus systems, wherein at least one first functional unit integrated in the communication interface module is configured to implement a connection to a configured superordinate controller via a first communication link on the basis of a first field bus protocol. In addition, at least one second functional unit integrated in the communication interface module is configured to implement a connection for field devices via a second communication link on the basis of a second field bus protocol. At least one further, third functional unit integrated in the communication interface module is configured to connect further field devices via input and/or output functionalities integrated in the communication interface module, and at least one serial interface integrated in the communication interface module can be used to configure the communication interface module.

According to an exemplary embodiment of the method and system of the present disclosure, the communication interface module is incorporated into a previously created hierarchical tree for the configuration of the control or automation system such that the configuration or implementation of the first functional unit thereof as a first branch in the represented and configured communication interface module is used to represent and configure a connection to a superordinate controller, for example, via a communication coupler that is likewise incorporated into the hierarchical tree of the control configuration, via a first communication link on the basis of a first field bus protocol.

The configuration or implementation of the second functional unit as a second branch in the represented and configured communication interface module is used to represent and configure a second connection to the field devices via a second communication link on the basis of a second field bus protocol.

According to an exemplary embodiment of the present disclosure, the configuration or implementation of the third functional unit as further branches from the configured communication interface module is used to represent and configure input and/or output functionalities for further field devices.

In addition, the communication interface module is assigned at least one additional branch that represent(s) the serial interfaces integrated in the communication interface module and allow(s) the configuration of the interfaces.

The effect achieved by means of the method and system of the present disclosure will therefore advantageously be a central configuration of the communication interface module by virtue of the communication interface module that is integrated directly into the hierarchical tree of the control configuration allowing complete configuration of a gateway between a first and a second bus protocol, the configuration of additional input and/or output functionalities and the configuration of serial interfaces. This substantially reduces the configuration complexity, since the otherwise customary connections that additionally need to be configured are dispensed with.

The system of the present disclosure for configuring at least one communication interface module in a control or automation system is provided for the communication of field bus systems processing different protocols. The communication interface module integrated in the inventive system includes at least one first functional unit, which forms the connection to a superordinate controller, for example, a programmable logic controller, via a first communication link on the basis of a first field bus protocol, and at least one second functional unit, which forms the connection for field devices via a second communication link on the basis of a second field bus protocol.

At least one serial interface that is integrated in the communication interface module can be used to implement programming of the module and/or communication with devices that are connected to the communication interface module.

The serial interfaces may, for example, be in the form of RS232, RS422 and/or RS485 interfaces and may have the same or different implementations.

The communication interface module has at least one third functional unit, which has input and/or output functionalities to which further field devices can be connected. The input/output functionalities may be input units, output units or else input and output functionalities as alternatives.

In accordance with an exemplary embodiment, the communication interface module uses the first communication link to communicate with the superordinate controller using the field bus protocol PROFINET, and uses the second communication link to communicate with the field devices using the field bus protocol CAN or CANopen.

According to an exemplary embodiment of the present disclosure, the communication interface module is incorporated into the hierarchical tree of the control configuration such that the configuration of the first functional unit as a first branch in the configured communication interface module can be used to represent and configure a connection to a superordinate controller via a first communication link on the basis of a first field bus protocol.

The configuration of the second functional unit as a second branch in the represented and configured communication interface module can be used to represent and configure a second connection to the field devices via a second communication link on the basis of a second field bus protocol.

In addition, according to an exemplary embodiment of the present disclosure, the configuration of the third functional unit as further branches from the configured communication interface module can be used to represent and configure input and/or output functionalities for further field devices.

In accordance with an exemplary embodiment, the communication interface module may have at least one associated additional branch that represents and configures the serial interface integrated in the communication interface module.

According to an exemplary embodiment, the communication interface module undertakes the communication of the field devices connected thereto with the superordinate control system by means of the first high-performance communication link in the form of a master connection, and undertakes the communication of the field devices connected to the second bus via the second communication link, which is integrated in the communication interface module and is in the form of a slave connection, the master and slave connections for the data interchange of the field devices via the bus system being implemented by means of specific software modules and/or hardware modules. This means that the communication module contains a slave function on the primary communication system (e.g., PROFINET) and a master function on the secondary communication system (e.g., CANopen).

The system substantially reduces the configuration complexity of the automation or control system, since the input units, output units or else input and output units, which are usually in the form of separate devices, can be configured by implementing their functions at just one location, and additional links are dispensed with. Hence, the graphical illustration of the control configuration is exactly the real situation for the hardware and all the configurable parameters of the devices, functionalities and the links thereof, which are arranged directly in the hierarchically structured tree of the automation or control system configuration created by means of the configuration tool.

The present disclosure advantageously allows modular configuration, for example of the number of inputs and/or outputs, use as digital or analog inputs and/or outputs and the stipulation of the setting parameters thereof using a single configuration tree and existent communication links, wherein the communication interface module with all of its functionalities, such as the input and/or output functionalities, the coupling of field bus systems processing different protocols and the integrated serial interfaces, which provide further communication links in the control system, is produced as what is known as a station.

The exemplary realization—shown in FIG. 1—of a gateway device 20 between at least two different field bus systems 1, 2 includes a control unit 10 in the form of a programmable logic unit. The central control unit 10 is connected to the field devices 30, 40 via its communication coupler 11 via the gateway device 20. In this case, the gateway device provides the communication capability between field buses 1, 2 from different protocols, for example, between PROFINET and CAN or CANopen.

The gateway device 20 includes a first functional unit, which handles the communication with the control unit 10 using the field bus protocol PROFINET 1 and has a second functional unit or interface for communication using the field bus protocol CAN or CANopen with CAN-compatible or CANopen-compatible devices 30 connected thereto.

Two mutually independent, configurable, DC-isolated serial interfaces 3, 4 that are integrated in the gateway device 20 and that are in the form of RS232, RS422 and/or RS485 interfaces, for example, can be used to implement serial communication via a serial bus with devices 40 connected thereto.

In addition, a third functional unit that is integrated in the gateway device 20 and that has input and/or output functionalities can have further field devices 50 connected to it. According to an exemplary embodiment, the third functional unit is configured to integrate the functions of the input/output units, which are usually implemented as separate devices, in the gateway device 20.

According to an exemplary embodiment, the gateway device 20 is equipped with analog and/or digital input/output functionalities, so that up to 10 expansion modules 50 can be connected thereto. Analog and digital input/output functionalities can be mixed without any problems.

Figure 2:
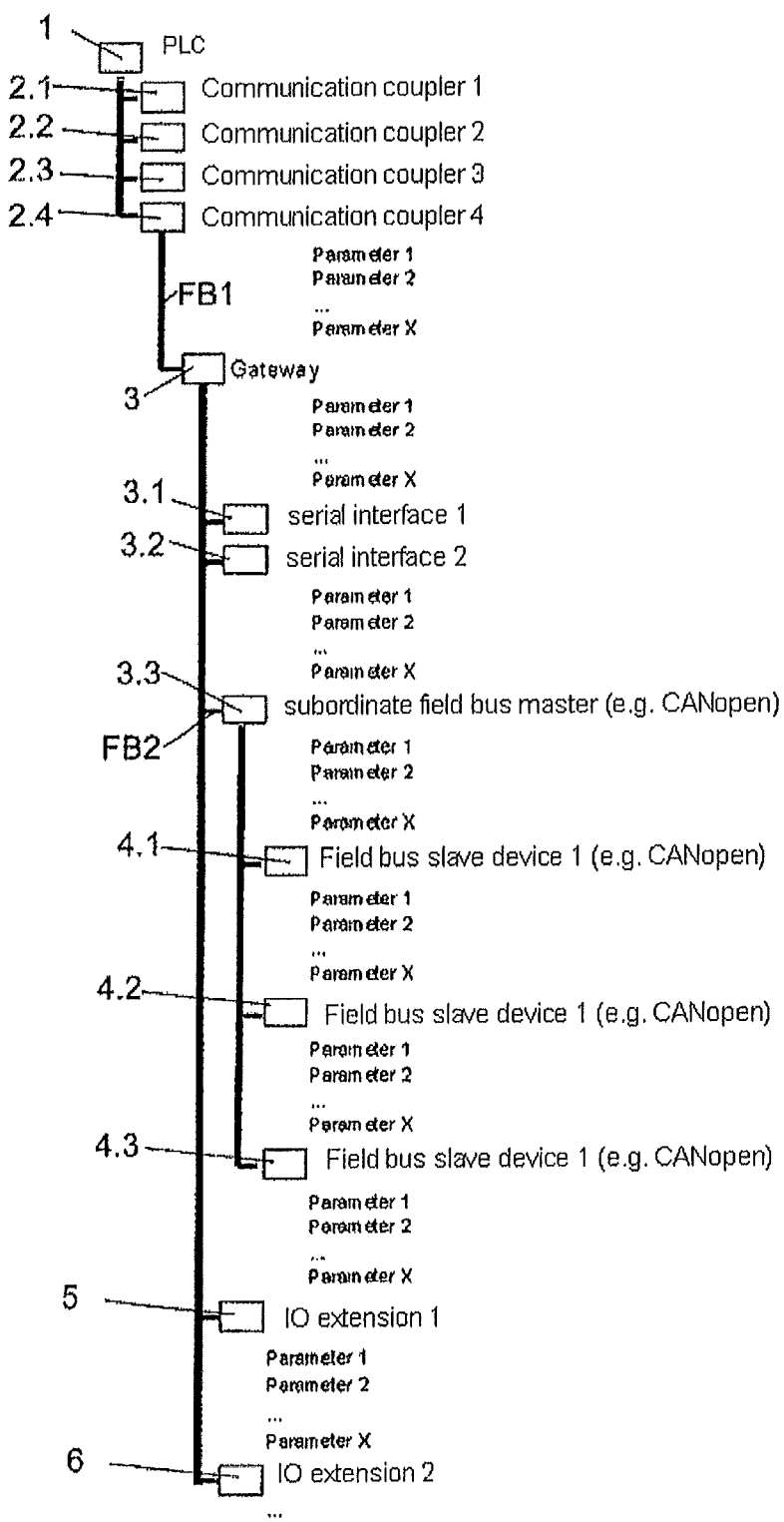
FIG. 2 shows a hardware structure that has been produced for a control system as a tree structure, according to an exemplary embodiment of the present disclosure.

FIG. 2 shows an exemplary map of the hardware structure of a control system as a hierarchical tree structure that has been produced by an application, for example, using the engineering tool, as part of a PLC or control project.

Starting from the configured superordinate controller 1, the tree represents various objects, such as communication couplers 2.1, 2.2, 2.3, a communication interface module 3—which is subsequently also called a gateway device—with its serial interfaces 3.1, 3.2, input and/or output functionalities 5, 6 for connecting further field devices and also a further interface 3.3 for connecting CANopen-compatible devices 30, as graphical objects with their links. In this case, first of all a superordinate connection, called a master connection or field bus master, is configured for the further interface 3.3. The field bus master 3.3 is configured such that further devices 4.1, 4.2, 4.3 operating as field bus slaves can be represented and configured thereon.

FIG. 2 therefore clarifies the configuration of the gateway device 3 in a control system of a peripheral design, wherein the gateway device 3 connects two field bus systems (FB1, FB2) to one another, namely communicates with the superordinate control unit 1 using an Ethernet protocol FB1 and with CANopen-compatible devices 30 using a CANopen protocol FB2.

In this case, a first functional unit that is configured in the gateway device 3 is configured to form, via a device 2.4 that is connected thereto and configured as a communication coupler, a connection to the superordinate control unit 1 via the first communication link FB1, which is configured as an Ethernet connection.

In addition, a second functional unit that is configured in the gateway device 3 is configured to represent a connection for field devices via the CANopen connection FB2.

A further, third functional unit that is configured in the gateway device 3 is used to represent and configure the connection of further field devices via the input and/or output functionalities 5, 6 configured in the gateway device 3.

The serial interfaces 3.1, 3.2 provided in the configuration of the gateway device 3 are likewise each represented and configured as a branch from the gateway device 3.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for configuring at least one communication interface module in a control or automation system, the communication interface module connecting at least two field bus systems to one another, the method comprising:
   implementing a connection, by at least one first functional unit integrated in the communication interface module, to a superordinate controller via a first communication link on the basis of a first field bus protocol;
   implementing a connection, by at least one second functional unit integrated in the communication interface module, for field devices via a second communication link on the basis of a second field bus protocol;
   connecting, by least one third functional unit integrated in the communication interface module, further field devices via input and/or output functionalities integrated in the communication interface module;
   incorporating the communication interface module into a previously created hierarchical tree for the configuration of the control or automation system such that the configuration of the at least one first functional unit as a first branch in the configured communication interface module represents and configures a connection to the superordinate controller, via the first communication link on the basis of the first field bus protocol;
   representing and configuring, by the configuration of the second functional unit as a second branch in the incorporated communication interface module, a second connection to the field devices via the second communication link on the basis of the second field bus protocol; and
   representing and configuring, by the configuration of the third functional unit as further branches from the incorporated communication interface module, at least one of input functionalities and or output functionalities for the further field devices,
   wherein the configuration of the first functional unit as the first branch in the configured communication interface module is used to represent and configure a connection to the superordinate controller, via a communication coupler, which is likewise incorporated into the hierarchical tree of the configuration of the control or automation system, via the first communication link on the basis of the first field bus protocol.

2. The method as claimed in claim 1, wherein at least one serial interface integrated in the communication interface module is configured as an additional branch in the communication interface module.

3. The method as claimed in claim 1, wherein the communication of the communication interface module with the superordinate controller is implemented using the PROFINET field bus protocol.

4. The method as claimed in claim 1, wherein the communication of the communication interface module with the field devices is implemented using at least one of the CAN field bus protocol and the CANopen field bus protocol.

5. The method as claimed in claim 4, wherein the communication of the communication interface module is implemented via two serial interfaces for serial communication with devices connected thereto, and
   wherein the communication via a further interface using at least one of the CAN field bus protocol and the CANopen field bus protocol is implemented with at least one of CAN-compatible and CANopen-compatible devices connected thereto, respectively.

6. The method as claimed in claim 1, wherein the communication of the communication interface module is implemented via two serial interfaces for serial communication with devices connected thereto, and wherein the communication via a further interface using at least one of the CAN field bus protocol and the CANopen field bus protocol is implemented with at least one of CAN-compatible and CANopen-compatible devices connected thereto, respectively.

7. A system for configuring at least one communication interface module in a control or automation system, the communication interface module connecting at least two field bus systems to one another, the communication interface module comprising:

at least one first functional unit configured to connect to a superordinate controller via a first communication link on the basis of a first field bus protocol;

at least one second functional unit configured to connect field devices to one another via a second communication link on the basis of a second field bus protocol; and at least one third functional unit integrated in the communication interface module configured to connect further field devices via input and/or output functionalities integrated in the communication interface module, wherein:

the communication interface module is incorporated into a previously created hierarchical tree for the configuration of the control or automation system such that (i) the configuration of the first functional unit as a first branch in the configured communication interface module is arranged to represent and configure a connection to the superordinate controller via the first communication link, (ii) the configuration of the second functional unit as a second branch in the represented and configured communication interface module is arranged to represent and configure a second connection to the field devices via the second communication link, (iii) the configuration of the third functional unit as further branches from the configured communication interface module is arranged to represent and configure input and/or output functionalities for the further field devices, and (iv) at least one additional branch exists for representing and configuring at least one serial interface integrated in the communication interface module, and wherein the configuration of the first functional unit as the first branch in the configured communication interface module is arranged to represent and configure a connection to the superordinate controller, via a communication coupler, which is likewise incorporated into the hierarchical tree of the configuration of the control or automation system, via the first communication link on the basis of the first field bus protocol.

8. The system as claimed in claim 7, wherein the at least one serial interface integrated in the communication interface module is configured as an additional branch in the communication interface module.

9. The system as claimed in claim 8, wherein the communication of the communication interface module with the superordinate controller is implemented using the PROFINET field bus protocol.

10. The system as claimed in claim 8, wherein the communication of the communication interface module with the field devices is implemented using at least one of the CAN field bus protocol and the CANopen field bus protocol.

11. The system as claimed in claim 8, wherein the communication of the communication interface module is implemented via two serial interfaces for serial communication with devices connected thereto, and wherein the communication via a further interface using at least one of the CAN field bus protocol and the CANopen field bus protocol is implemented with at least one of CAN-compatible and CANopen-compatible devices connected thereto, respectively.

12. An automation or control system for at least one of process automation and machine control comprising the communication interface module as claimed in claim 7.

* * * * *